United States Patent [19]
Kobayashi et al.

[11] Patent Number: 5,166,742
[45] Date of Patent: Nov. 24, 1992

[54] OPTICAL DEFORMATION MEASURING APPARATUS BY DOUBLE-WRITING SPECKLE IMAGES INTO A SPATIAL LIGHT MODULATOR

[75] Inventors: Yuji Kobayashi; Tamiki Takemori; Tsutomu Hara; Naohisa Mukohzaka; Narihiro Yoshida, all of Shizuoka, Japan

[73] Assignee: Hamamatsu Photonics K. K., Shizuoka, Japan

[21] Appl. No.: 748,884

[22] Filed: Aug. 23, 1991

[30] Foreign Application Priority Data

Nov. 30, 1990 [JP] Japan .................................. 2-339854

[51] Int. Cl.$^5$ ............................................. G01L 1/24
[52] U.S. Cl. .................................. 356/35.5; 359/86; 359/55; 73/655; 73/656; 356/347
[58] Field of Search ...................... 356/347, 348, 35.5; 73/655, 657, 656; 359/86, 55

[56] References Cited

U.S. PATENT DOCUMENTS

| | | | |
|---|---|---|---|
| 4,506,550 | 3/1985 | Sandhu ................................. | 359/86 |
| 4,651,567 | 3/1987 | Sandhu ................................. | 359/86 |
| 4,884,875 | 12/1989 | Okumura ............................. | 359/55 |

FOREIGN PATENT DOCUMENTS 57-187605 11/1982 Japan .
62-71926 4/1987 Japan .

OTHER PUBLICATIONS

"Real-Time In-Plane Vibration Measurements By Speckle Interferometry With the Aid of Liquid Crystal Light Valve", Tamiki Takemori, et al., Optics Communications, vol. 32, No. 1, Jan. 1990, pp. 198–200.
"Spatial Light Modulator Using Ferroelectric Liquid Crystal", Seiji Fukushima, et al., pp. 43–47.
"Measurement of Surface Displacement by Speckle Image Technique—Quasi Real-Time Measurement Utilizing a Liquid Crystal Display—", Eiji Okada, et al., The transactions of the Institute of Electronics, Information and Communication Engineers C-1, vol. J73--C-1 No. 3, pp. 128–133, Mar. 1990.
"Analyzing Method of Flow Using Liquid Crystal TV", Muneharu Ishikawa, et al., Image information (I), pp. 83–90, Jan. 1991.

Primary Examiner—Samuel A. Turner
Assistant Examiner—Richard E. Kurtz, II
Attorney, Agent, or Firm—Finnegan, Henderson, Farabow, Garrett and Dunner

[57] ABSTRACT

An object is typically illuminated by laser light, and reflected light carrying a speckle pattern is amplified by an image intensifier. First and second speckle patterns representing the object before and after its deformation, respectively are written by double writing into a ferroelectric liquid crystal spatial light modulator (FLC-SLM). The double-written image is read out from the FLC-SLM, and converted by a Fourier transform optical system into an output optical image, i.e., Young's fringe. The output optical image is detected by a photoelectric converter, and analyzed by an image processing device to determine a deformation of the object.

10 Claims, 9 Drawing Sheets

OPTICAL DEFORMATION MEASURING APPARATUS BY DOUBLE-WRITING SPECKLE IMAGES INTO A SPATIAL LIGHT MODULATOR

BACKGROUND OF THE INVENTION

The present invention relates to an apparatus for optically measuring a deformation of an object.

A speckle method is known as one of various methods of optically measuring a deformation, including a movement, of an object. For example, Japanese Patent Application Unexamined Publication No. Sho. 57-187605 discloses an optical movement measuring apparatus utilizing the speckle method, in which a spatial light modulator such as a BSO is employed to perform a real-time measurement.

Further, there exist optical deformation measuring apparatuses employing other types of spatial light modulators such as a liquid crystal television, TN-LCLV and thermoplastic.

However, the BSO spatial light modulator necessarily makes the apparatus large because a write light source and a read light source should be separate ones.

In the case of using the liquid crystal television, no memory function is obtained, and therefore a frame memory is required to provide a double recording function. This causes a limitation on an interval between recording events.

Because of the lack of a memory function, the TN-LCLV apparatus utilizes the effective voltage effect of a liquid crystal. Therefore, it can only be applied to measurements of such deformation (movement) as simple harmonic motion.

Since the thermoplastic apparatus needs a longer recording time of several seconds, it cannot provide a real-time processing. Therefore, it can only be used for measurements in which movement speed or deformation speed of an object is slow.

In each of the above apparatuses, the sensitivity needs to be changed with the reflectivity of an object or a distance between the object and a recording device. However, the sensitivity of each apparatus cannot be changed arbitrarily.

Although it may be possible to change the measurement period instead of changing the sensitivity, this will cause limitations on the kinds of measurable deformations (movements) and on the measurement interval.

In the conventional apparatuses, which cannot change its sensitivity arbitrarily, it is required to insert an ND filter or the like in a path of a light beam to be incident on an object, to change the light intensity. This is a cumbersome operation.

On the other hand, when a laser light source is employed in the speckle photography, Young's fringe obtained by Fourier-transforming a laser speckle pattern is analyzed by an image analyzing apparatus. But, the image analyzing apparatus is not only expensive but also needs complicated computing software.

In the speckle photography, Young's fringe appears only in the case where the displacement of a speckle is larger than its average diameter. Therefore, the minimum measurable displacement is determined by the speckle diameter, and no measurement can be performed if the speckle displacement is too small.

Further, in the conventional speckle photography using a spatial light modulator, a speckle pattern is stored in the single spatial light modulator by double writing and a deformation is detected on a one-phenomenon basis. Therefore, a deformation between sets of deformations cannot be measured.

SUMMARY OF THE INVENTION

The present invention has been made in view of the foregoing problems of the prior art, and has an object of providing an optical deformation measuring apparatus which is not a large-sized one but capable of arbitrarily changing its sensitivity.

Another object of the invention is to provide an optical deformation measuring apparatus which can readily measure a deformation (movement) of an object on a real-time basis without using an expensive image analyzing apparatus and complicated computing software.

A further object of the invention is to provide an optical deformation measuring apparatus which can measure a deformation even in such a case that a speckle displacement is smaller than a speckle diameter.

A still further object of the invention is to provide an optical deformation measuring apparatus which, with a simple construction, can measure a deformation (movement) of an object consecutively on a real-time basis, and can measure a deformation between sets of deformations.

According to the present invention, an apparatus for measuring a deformation of an object comprises:

a light source for illuminating the object;

input means for forming an input optical image based on reflected or transmitted light from the object;

a spatial light modulator for storing by double writing the input optical images of the object before and after the deformation thereof in the form of a double-written image;

a read optical system for introducing read light for reading out the double-written image from the spatial light modulator;

a Fourier transform optical system for Fourier-transforming an output optical image read out from the spatial light modulator; and observing means for measuring the Fourier-transformed image to determine the deformation of the object.

A second spatial light modulator, and a second Fourier transform optical system may additionally be disposed between the first Fourier transform optical system and the observing means. In this case, a second read optical system is provided to read out an image stored in the second spatial light modulator. With this construction, the double-written image is stored in the second spatial light modulator in the form of Young's fringe, and then converted by the second Fourier-transform optical system into a light spot.

Further, a second input means, a second spatial light modulator, and optical means may additionally be provided. The optical means is arranged such as to introduce the read light reflected from the first spatial light modulator to an output surface of the second spatial light modulator to produce an output optical image which has been subjected to an exclusive-OR operation between a first input image before the deformation and a second input image after the deformation.

DESCRIPTION OF THE PREFERRED EMBODIMENTS

Embodiments of the present invention will be described hereinafter with reference to the drawings.

Figure 1:
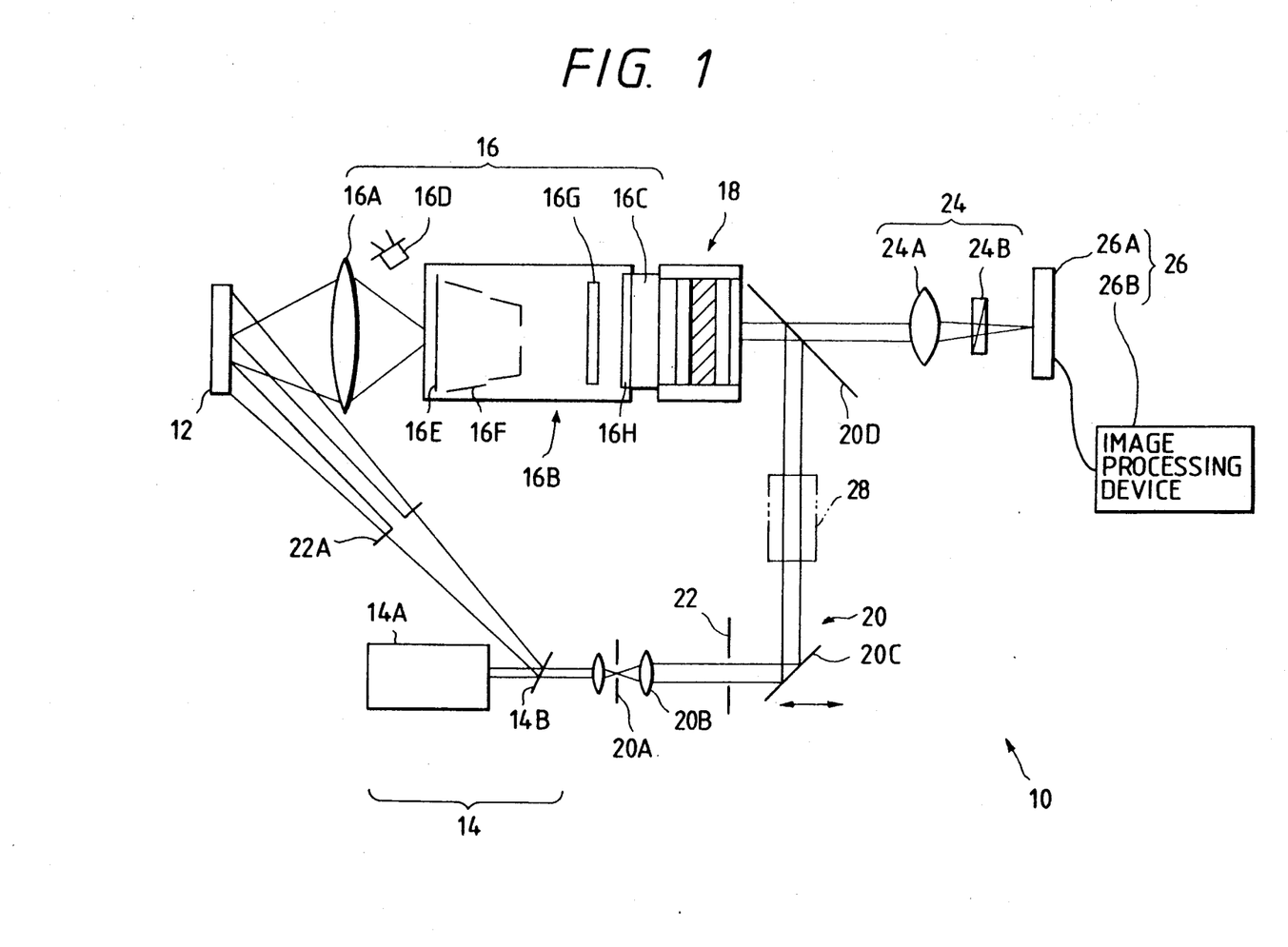
FIG. 1 is an optical system diagram showing an optical deformation measuring apparatus according to a first embodiment of the present invention.

Referring to FIG. 1, an apparatus for optically measuring a deformation according to a first embodiment consists of a laser light source 14 for emitting laser light to be incident on an object 12; an imaging optical system 16 and a ferroelectric liquid crystal spatial light modulator (hereinafter abbreviated as "FLC-SLM") 18 for subjecting an image of the object 12, which is carried by the laser light emitted from the light source 14 and reflected by the object 12, to double writing before and after the object's deformation; a read optical system 20 for reading out a signal stored in the FLC-SLM 18; a variable aperture 22 for changing the diameter of a read light beam; Fourier transform optical system 24 for Fourier-transforming the signal read out from the FLC-SLM 18 by the read optical system 20; an observing means 26 for detecting and analyzing a Fourier-transformed image formed on a Fourier transform surface by the Fourier transform optical system 24.

The laser light source 14 consists of a He-Ne laser 14A, and a half mirror 14B for transmitting part of the laser beam emitted from the He-Ne laser 14A while reflecting the other part. The half mirror 14B is adapted to provide a variable reflection angle.

The imaging optical system 16 includes an imaging lens 16A, an image intensifier (hereinafter abbreviated as "I.I.") 16B, and a fiber plate 16C for coupling the output surface of the I.I. 16B to the light input surface of the FLC-SLM 18, which are arranged in the above order from the object 12.

Reference symbol 16D represents an erasing LED for erasing the stored image by illuminating the input surface of the I.I. 16B.

The I.I. 16B includes a photocathode 16E, an electron lens system 16F, a microchannel plate (hereinafter abbreviated as "MCP") 16G, and an output phosphor screen 16H, which are arranged in this order.

Figure 2:
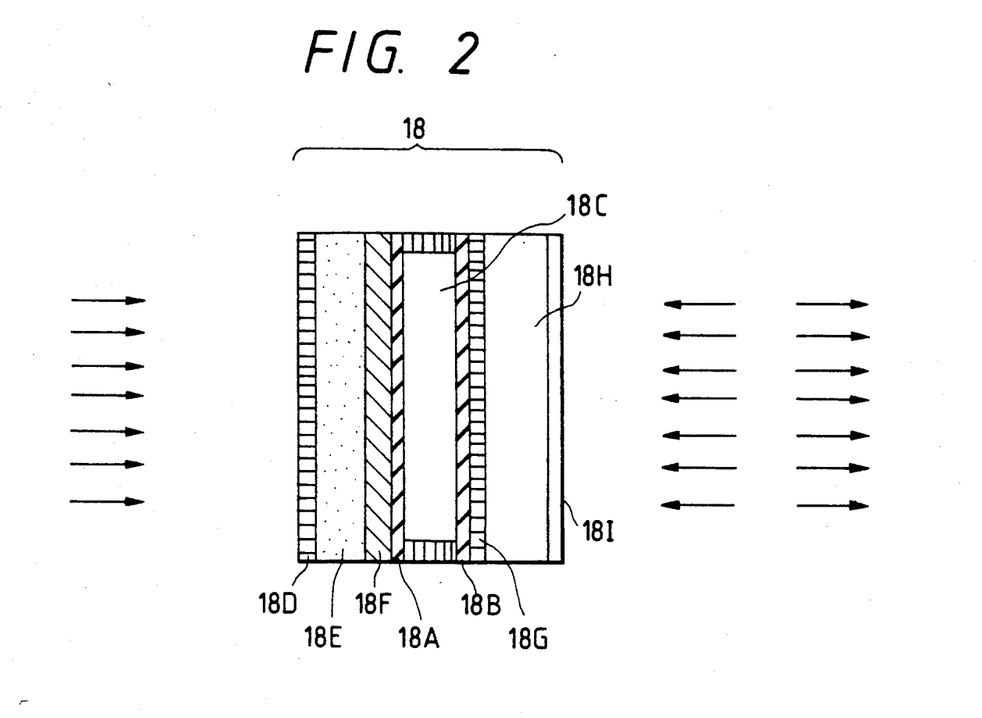
FIG. 2 is a sectional view showing a ferroelectric liquid crystal spatial light modulator (FLC-SLM) employed in the apparatus of FIG. 1.

As shown in FIG. 2, the FLC-SLM 18 is constructed by laminating the following components: a pair of oriented layers 18A, 18B and a forroelectric liquid crystal layer 18C disposed therebetween; a write-side transparent electrode 18D, an amorphous silicon (hereinafter abbreviated as "a-Si") layer 18E as an addressing material, and a dielectric mirror 18F, which are arranged in this order from the write-light incidence side toward the ferroelectric liquid crystal layer 18C; and readside transparent electrode 18G, a glass layer 18H and an anti-reflection layer 18I, which are arranged in this order from the ferroelectric liquid crystal layer 18C toward the read side.

The read optical system 20 is to lead the divided laser beam from the half mirror 14B, as the read light, to the read side of the FLC-SLM 18, and includes a spatial filter 20A, a collimator lens 20B, a movable mirror 20C and a half mirror 20D, which are arranged in this order from the half mirror 14B.

The Fourier transform optical system 24 consists of a Fourier transform lens 24A for Fourier-transforming the read light transmitted from the half mirror 20D, and a polarizer 24B for passing the Fourier-transformed light.

The observing means 26 includes a photoelectric converter 26A for outputting an electric signal in accordance with the intensity of the Fourier-transformed light from the polarizer 24B, and an image processing device 26B for performing an image processing on the output signal of the photoelectric converter 26A.

The movable mirror 20C is moved so that the laser beam emitted from the He-Ne laser 14A scans the read-side surface of the FLC-SLM 18.

The variable aperture 22 is disposed between the collimator lens 20B of the read optical system 20 and the movable mirror 20C. Further, reference symbol 22A represents an illumination-side variable aperture for changing the diameter of the laser beam emitted from the He-Ne laser 14A and reflected by the half mirror 14B.

The operation of the optical deformation measuring apparatus of the first embodiment will be described below.

Figure 3A:
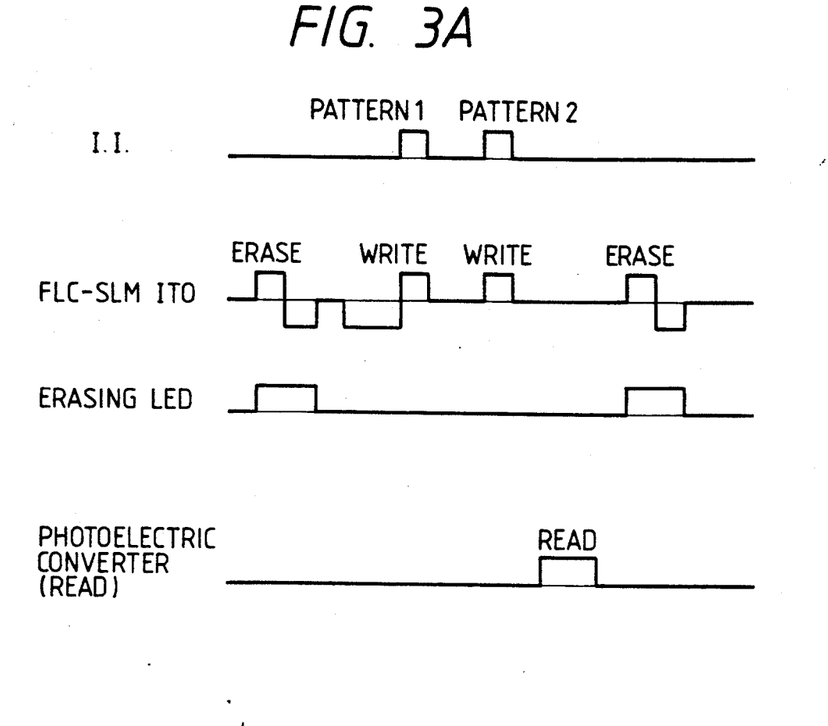
FIGS. 3A and 3B are timing charts showing the operation of the apparatus of FIG. 1.

First, the laser beam is emitted by the He-Ne laser 14A, reflected by the half mirror 14B, and then incident on the object 12 to be measured. It is noted that, as shown in FIG. 3A, the input surface of the I.I. 16B has been illuminated in advance by means of the erasing LED 16D and the stored image has been erased.

The reflected light from the object 12 passes through the imaging lens 16A, and is thereby imaged onto the photocathode 16E. The I.I. 16B converts the reflected light, which carries a speckle pattern, into an photoelectron image, multiplies it with the MCP 16G, and finally outputs on the output phosphor screen 16H an optical image corresponding to the multiplied electron image.

The output optical image is then provided to the FLC-SLM 18 via the fiber plate 16C.

Being equipped with the forroelectric liquid crystal layer 18C which operates on a binary basis, the FLC-SLM 18 has a threshold with respect to the input light intensity. Therefore, by changing the drive voltage, a voltage across the forroelectric liquid crystal layer 18C can be made different even with the same input light intensity, and the sensitivity with respect to the input light intensity can be adjusted. However, its dynamic range is narrow.

On the other hand, the sensitivity of the I.I. 16B can be adjusted with a wider dynamic range by changing a voltage applied across the MCP 16G.

The optical image transmitted by the fiber plate 16C is written into the ferroelectric liquid crystal layer 18C. Having a memory function, the ferroelectric liquid crystal layer 18C can store an image before a deformation (speckle pattern 1) of the object 12 as shown in FIG. 3A.

Next, with the speckle pattern 1 being stored in the ferroelectric liquid crystal layer 18C, a speckle pattern 2 of the object 12, which has moved by a distance $\Delta S$ in a period $\Delta t$, is also stored in the ferroelectric liquid crystal layer 18C in the same manner. That is, the speckle patterns 1 and 2 of the object 12 are stored by double writing.

Since the response time of the ferroelectric liquid crystal is several tens of micro-seconds, it can satisfactorily respond to fast deformations such as those of a speedometer. Further, because of its binary storage, the ferroelectric liquid crystal is suitable for storage of speckle patterns which are black-and-white patterns.

The double speckle pattern thus stored in the ferroelectric liquid crystal layer 18C is read out by applying the divided laser beam from the half mirror 14B to it via the read optical system 20. The read-out double speckle pattern is optically Fourier-transformed by the Fourier transform lens 24A onto the input surface of the photoelectric converter 26A.

The polarizer 24B is not always necessary. It may be disposed as shown in FIG. 1 for the light intensity adjustment or elimination of stray light.

Young's fringe is formed on the input surface of the photoelectric converter 26A. The magnitude and direction of the deformation of the object 12 is obtained by detecting Young's fringe by the photoelectric converter 26A, and determining the interval and direction of Young's fringe by the image processing device 26B.

The two-dimensional average of the deformation within the object area illuminated by the laser beam can be obtained by changing the aperture diameter of the latter or both of the illumination-side variable aperture 22A and the read-side variable aperture 22.

Although the spatial light modulator of the above embodiment is of the type that is equipped with a ferroelectric liquid crystal layer, the present invention is not limited thereto but the spatial light modulator may be of other types.

Figure 4:
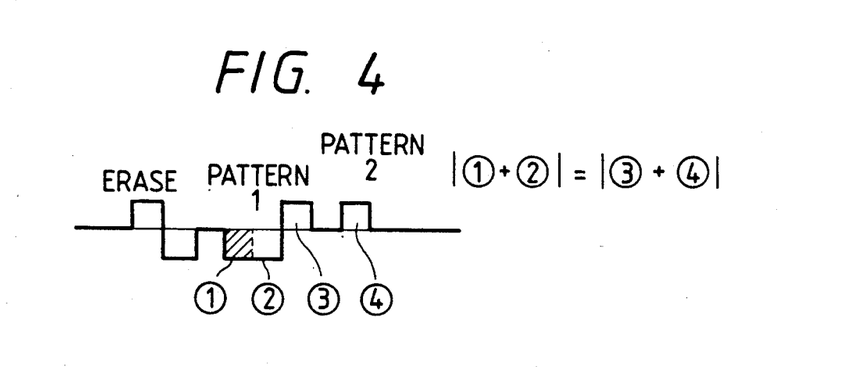
FIG. 4 shows correction voltage pulses applied to the FLC-SLM of FIG. 2.

It is noted that the double writing is performed by applying correction voltage pulses to the transparent electrodes 18D, 18G of the ferroelectric liquid crystal as shown in FIG. 4.

Although, in the above embodiment, the laser beam diameter is varied by means of the variable apertures 22 and 22A, the invention is not limited thereto. The variable aperture may be replaced by an optical zooming device for changing the beam diameter and the illumination or read-out area, such as a zooming tube 28 as indicated by the two-dot chain line in FIG. 1.

Further, although the above embodiment employs the I.I. 16B in the imaging optical system 16, the I.I. 16B may be omitted when the amplification of the optical image is not required.

Figure 3B:
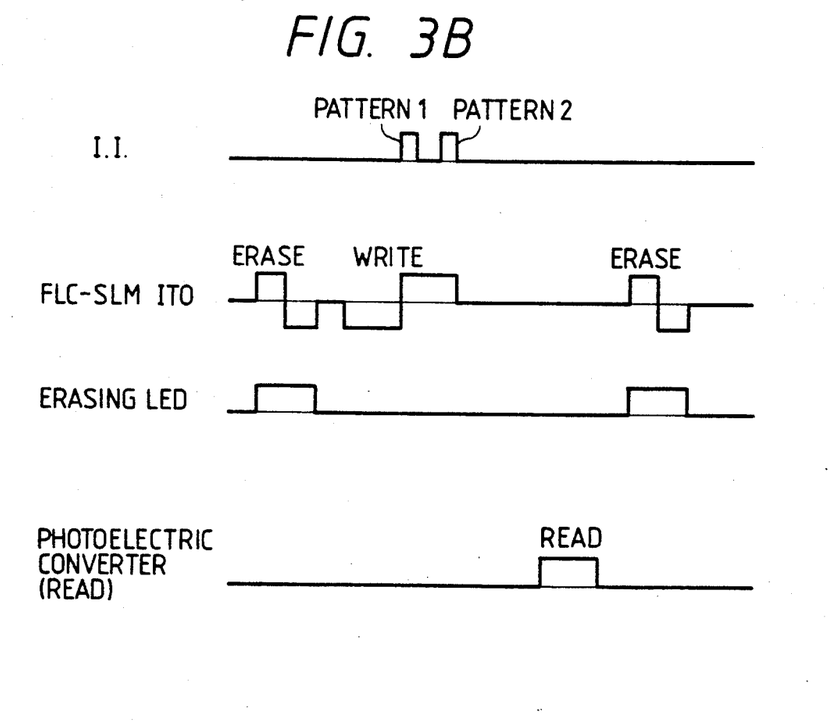

FIG. 3B is a timing chart showing an alternative operation of the apparatus of FIG. 1. In this case, the object 12 is illuminated two times with an interval of $\Delta t$ in a single write period of the FLC-SLM 18.

Figure 5:
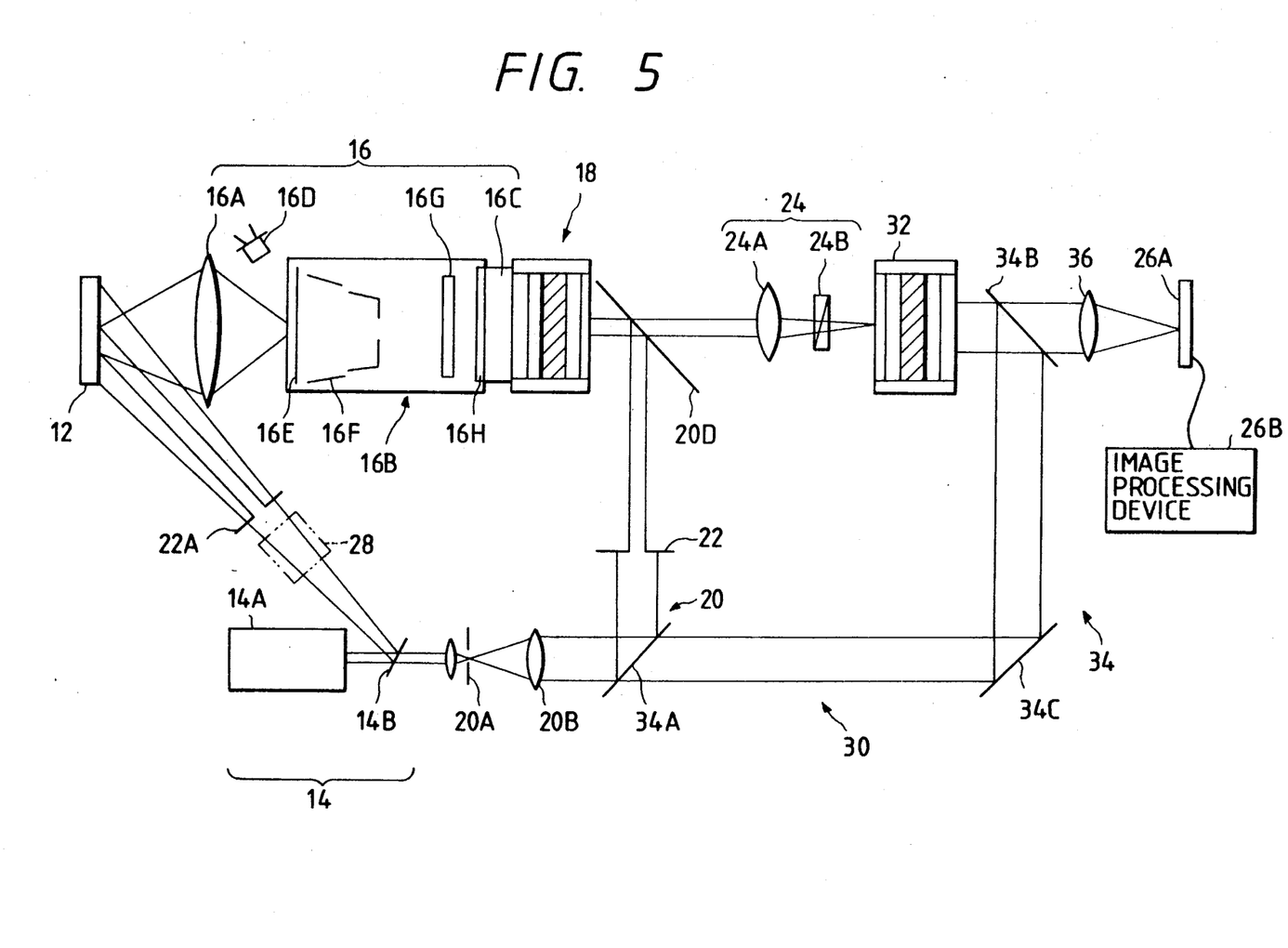
FIG. 5 is an optical system diagram showing an optical deformation measuring apparatus according to a second embodiment of the invention.

An optical deformation measuring apparatus according to a second embodiment will be described below with reference to FIG. 5.

The second embodiment is different from the first embodiment of FIG. 1 in that an optical deformation measuring apparatus 30 further includes, between the polarizer 24B and photoelectric converter 26A, a second FLC-SLM 32, a second read optical system 34 for applying read light to the second FLC-SLM 32, and a second Fourier transfer lens 36 for optically Fourier-transforming a signal read out with the second read optical system 34, which are arranged in this order.

The further differences are that a half mirror 34A is provided instead of the movable mirror 20C in FIG. 1, and that the read-side variable aperture 22 is disposed between the half mirrors 34A and 20D.

Since the remaining structure of the second embodiment is the same as the first embodiment of FIG. 1, the parts of the second embodiment common to the first embodiment are identified by the same reference symbols and redundant descriptions therefor are omitted. Further, since the second FLC-SLM 32 has the same structure as the FLC-SLM 18, a detailed description for it is also omitted.

The second read optical system 34 includes a half mirror 34B disposed between the second FLC-SLM 32 and the second Fourier transform lens 36, the half mirror 34A for branching the laser beam from the read optical system 20, and a mirror 34C for reflecting the laser beam passed through the half mirror 34A toward the half mirror 34B.

The operation of the second embodiment will now be described hereinafter.

As in the same manner as the first embodiment of FIG. 1, the images of the object 12 before and after its deformation (movement) are stored in the first FLC-SLM 18 as a double-written speckle pattern, and the stored images are read out with the read optical system 20 and then Fourier-transformed by the Fourier transform optical system 24.

In the second embodiment, since the second FLC-SLM 32 is located at the same position as the photoelectric converter 26A of the first embodiment, Young's fringe, which is an optically Fourier-transformed image of the speckle pattern, is stored in the second FLC-SLM 32.

Figure 6:
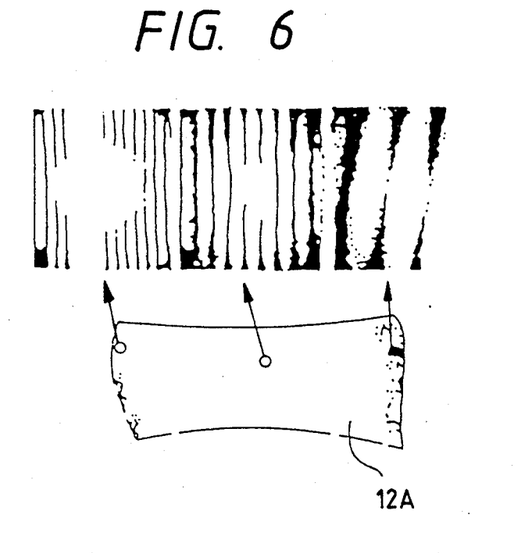
FIG. 6 shows an example of Young's fringe of a rubber film obtained by the apparatus of FIG. 1.

FIG. 6 shows an example of Young's fringe, in which the object 12 is a rubber film 12A. In FIG. 6, the direction perpendicular to the arrangement direction of Young's fringe corresponds to the movement direction of the object 12, and the reciprocal of the fringe interval is proportional to the movement value of the object 12.

If the signal of Young's fringe stored in the second FLC-SLM 32 is read out and then optically Fourier-transformed by the second Fourier transform lens 36, a light spot having a diameter proportional to the reciprocal of the fringe interval can be obtained at a position distant from the 0th order light and in the fringe arrangement direction. Therefore, the deformation amount (movement value) and the deformation direction (movement direction) of the object 12 can be measured by detecting the position of the light spot by the photoelectric converter 26A and the image processing device 26B.

The second embodiment can provide the following advantages. Young's fringes can be analyzed without using an expensive image analyzing apparatus and complicated computing software therefor, but with a photoelectric converter and an image processing device. The deformation amount (movement value) of an object can be measured in a non-contact, real-time manner.

Next, a third embodiment shown in FIG. 7 will be described.

An optical deformation measuring apparatus 40 according to this embodiment is different from the apparatus 10 of FIG. 1 in that a FLC-SLM 42 has a two-piece-divided optical writing section, that a pre-processing tube 44 is employed instead of the I.I. 16B, and that a read optical system 46 is provided which has such a structure as conforms to the two-piece-divided optical writing section of the FLC-SLM 42. Further, a laser light source 50 is slightly different from the laser light source 14 of the first embodiment of FIG. 1, as described later.

The FLC-SLM 42 is different from the FLC-SLM 18 of FIG. 1 only in that its write-side transparent electrode consists of divided transparent electrodes 48A, 48B which operate independently. Therefore, further explanations therefor are omitted here.

The pre-processing tube 44 includes a photocathode 44A, electron lens system 44B, deflection electrodes 44C, MCP 44D and output phosphor screen 44E, which are arranged in this order from the side of the imaging lens 16A. An electron image produced by the photocathode 44A can be deflected by the deflection electrodes 44C toward one of the divided transparent electrodes 48A, 48B arbitrarily.

The laser light source 50 consists of a He-Ne laser 14A, spatial filter 20A, collimator lens 20B and half mirror 50C, which are arranged in this order. A laser beam emitted by the He-Ne laser 14A is passed through the spatial filter 20A and collimator lens 20B, and reflected by the half mirror 50C. Then, the laser beam is incident on the object 12 after its peripheral portion is eliminated by an aperture 50D.

The read optical system 46 includes a mirror 46A for reflecting a laser beam passed through the half mirror 50C of the laser light source 50, a mirror 46B for directing the laser beam (read light) reflected by the mirror 46A toward the first read-side area of the FLC-SLM 42 which corresponds to the divided transparent electrode 48A, and a rectangular prism 46C disposed opposite the read-side face of the FLC-SLM 42 for directing an optical signal read out from the first area toward the second read-side area which correspond to the divided transparent electrode 48B.

A Fourier transform lens 24A is disposed on an optical path of the optical signal which is read out from the second area corresponding to the divided transparent electrode 48B.

The operation of the third embodiment will be described hereinafter.

The laser light is emitted from the laser light source 50 and then reflected by the object 12 before its deformation. An electron beam carrying an electron image is generated in the pre-processing tube 44 in response to the reflected light, and is deflected by the deflection electrodes 44C toward the divided transparent electrode 48A. As a result, a speckle pattern 1 is stored in the first area of the optical writing section which corresponds to the divided transparent electrode 48A.

Then, another electron beam carrying an electron image of the object 12 after its deformation is deflected by the deflections electrodes 44C toward the divided transparent electrode 48B, and then multiplied by the MCP 44D. The electron image is converted into an optical image by the output phosphor screen 44E, and the resultant optical image representing a speckle pattern 2 is stored in the second area of the optical writing section which corresponds to the divided transparent electrode 48B.

Then, the speckle pattern 1 being stored in the first area corresponding to the divided transparent electrode 48A is read out with the laser beam introduced by the read optical system 46. The resultant read light is two-times reflected by the rectangular prism 46C, and is again incident on the FLC-SLM 42 as read light for the second area corresponding to the divided transparent electrode 48B.

As a result of this procedure, the speckle patterns 1 and 2 are superposed to perform an exclusive-OR operation, and the superposed image is read out.

Figure 8:
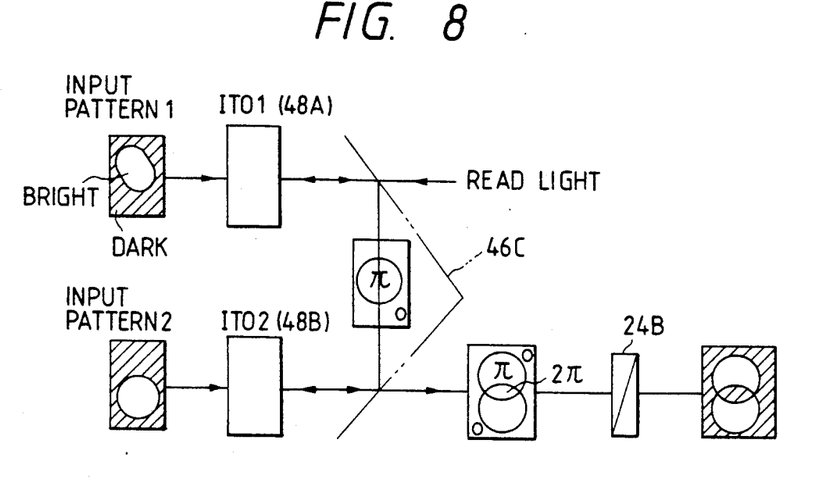
FIG. 8 shows how an exclusive-OR operation is performed on two input speckle patterns.

Referring to FIG. 8, the above procedure will be described in more detail. The speckle pattern 1 being stored in the first area of the optical writing section corresponding to the divided transparent electrode 48A is first read out by linearly polarized light, and then reflected by the first reflection face (which serves as a half mirror) of the rectangular prism 46C. When the pattern 1 is read out, the phase of bright portions of the pattern 1 is changed by $\pi$. In this state, the light is again reflected by the second reflection face (which also serves as a half mirror) of the rectangular prism 46C, and is made incident, as read light, on the second area of the writing section corresponding to the divided transparent electrode 48B where the speckle patter 2 is stored.

The pattern 2 is read out by the read light carrying the pattern 1 to produce combined read light carrying a pattern as shown in the bottom-right part of FIG. 8. That is, the portion in which a bright portion of the speckle pattern 1 and that of the speckle pattern 2 are superposed on each other experiences a phase change of $2\pi$, and will have a linear polarization in the same direction as the dark portion. The remaining bright portions experience a phase change of $\pi$.

After passing through the polarizer 24B, a double speckle pattern which has experienced the exclusive-OR operation is finally obtained as shown in the right end part of FIG. 8.

Figure 9A:
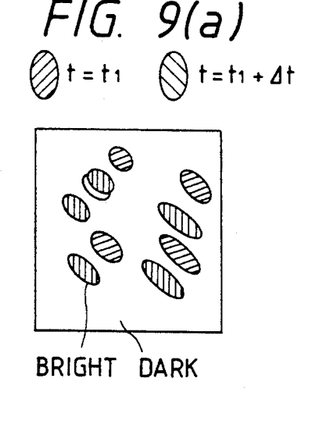
FIGS. 9(a)-9(c) show how an exclusive-OR operation is performed on two input speckle patterns in which a speckle displacement is smaller than a speckle diameter.
Figure 9B:
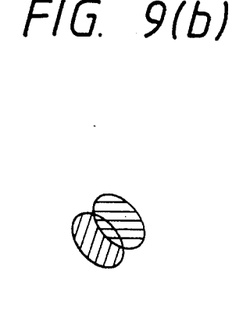
Figure 9C:
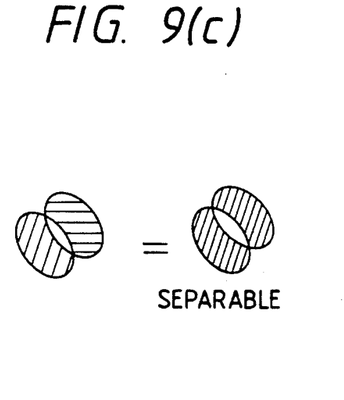

The production of such a double speckle pattern provides the following advantage. As shown in FIGS. 9(a)-9(c), even if the displacement of a speckle is smaller than its average diameter and two speckles are overlapped with each other, they can be separated from each other, which means improvements in the resolution and contrast.

It is noted that in the third embodiment the FLC-SLM 42, which is provided with the two divided transparent electrodes 48A, 48B, has substantially the same function as two FLC-SLMs. Since it suffices that there substantially exist two spatial light modulators, the present invention is not limited to the construction of the third embodiment. For example, two independent spatial light modulators may be employed such that signal light read out from one modulator is used as read light for the other modulator.

In the third embodiment described above, even if the displacement of a speckle is smaller than its average diameter, Young's fringe can be obtained to enable a deformation measurement. In other words, the third embodiment can present precise measurements.

Next, a fourth embodiment will be described, which can be a modification to each of the first, second and third embodiments.

Figure 10:
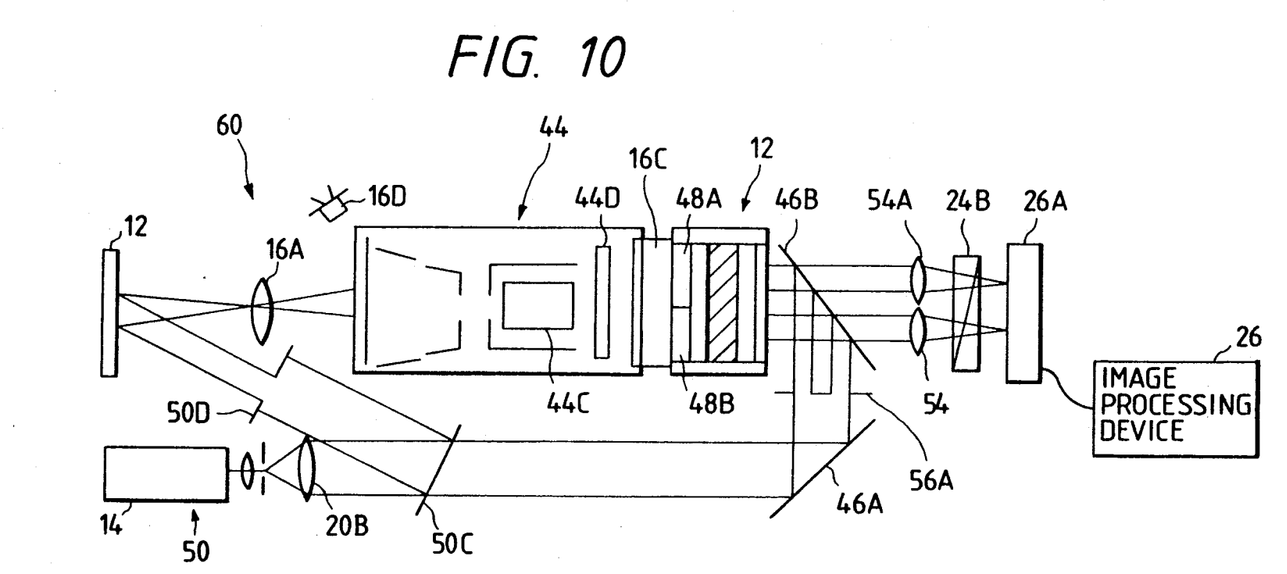
FIG. 10 is an optical system diagram showing an optical deformation measuring apparatus according to a fourth embodiment of the invention.

An optical deformation measuring apparatus 60 according to the fourth embodiment can solve the problem of the above embodiments that a deformation between sets of deformations cannot be measured since speckle patterns are stored in one FLC-SLM by double writing and a measurement is performed on a one-phenomenon basis.

The optical measuring apparatus 60 of the fourth embodiment shown in FIG. 10 is different from the apparatus 40 of the third embodiment (FIG. 7) in that the two areas corresponding to the respective two divided transparent electrodes 48A, 48B are separately illuminated by read beams, and that the read-out optical signals are transformed by separate Fourier transform lenses 54A, 54B and imaged on a photoelectric converter 26A through a common polarizer 24B.

In the fourth embodiment, an aperture 56A is disposed between a half mirror 50C and a mirror 46B, for dividing the laser beam reflected by the mirror 46A into two parts such that they correspond to the respective divided transparent electrodes 48A, 48B.

Figure 7:
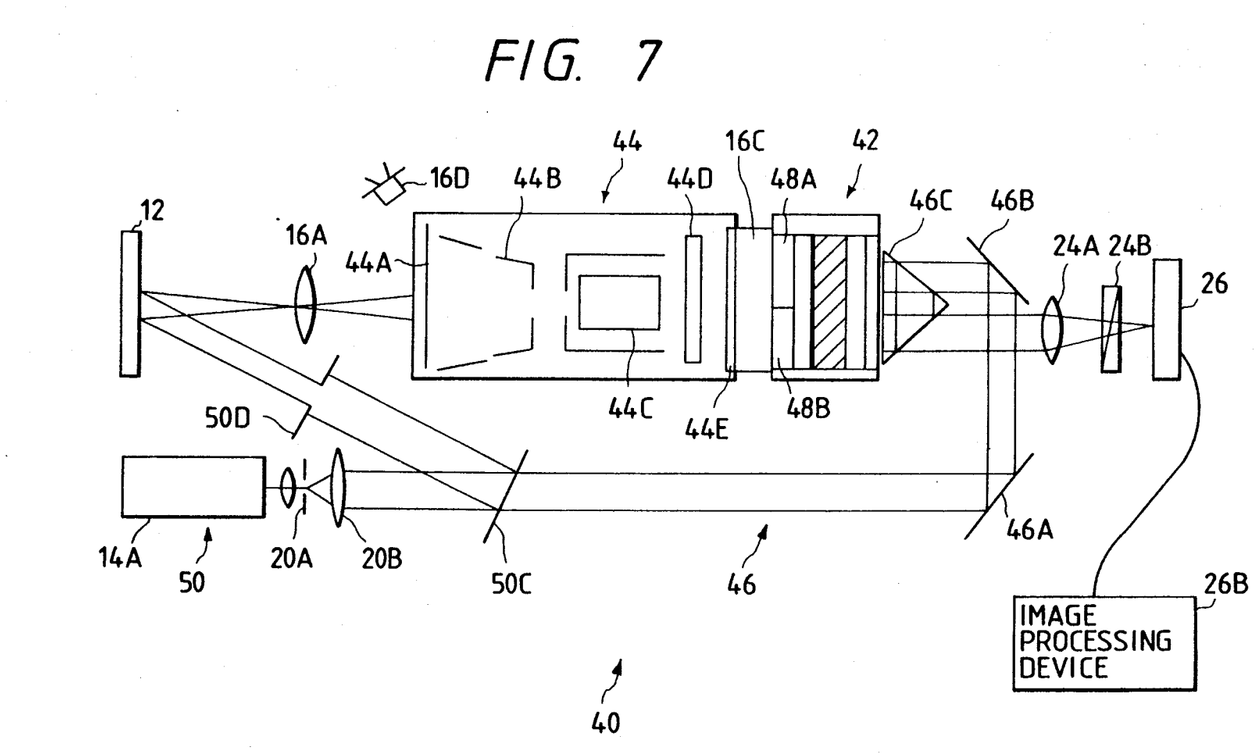
FIG. 7 is an optical system diagram showing an optical deformation measuring apparatus according to a third embodiment of the invention.

Since the other parts of the fourth embodiment is the same as the third embodiment of FIG. 7, they are represented by the same reference symbols and detailed descriptions for those are omitted.

Figure 11:
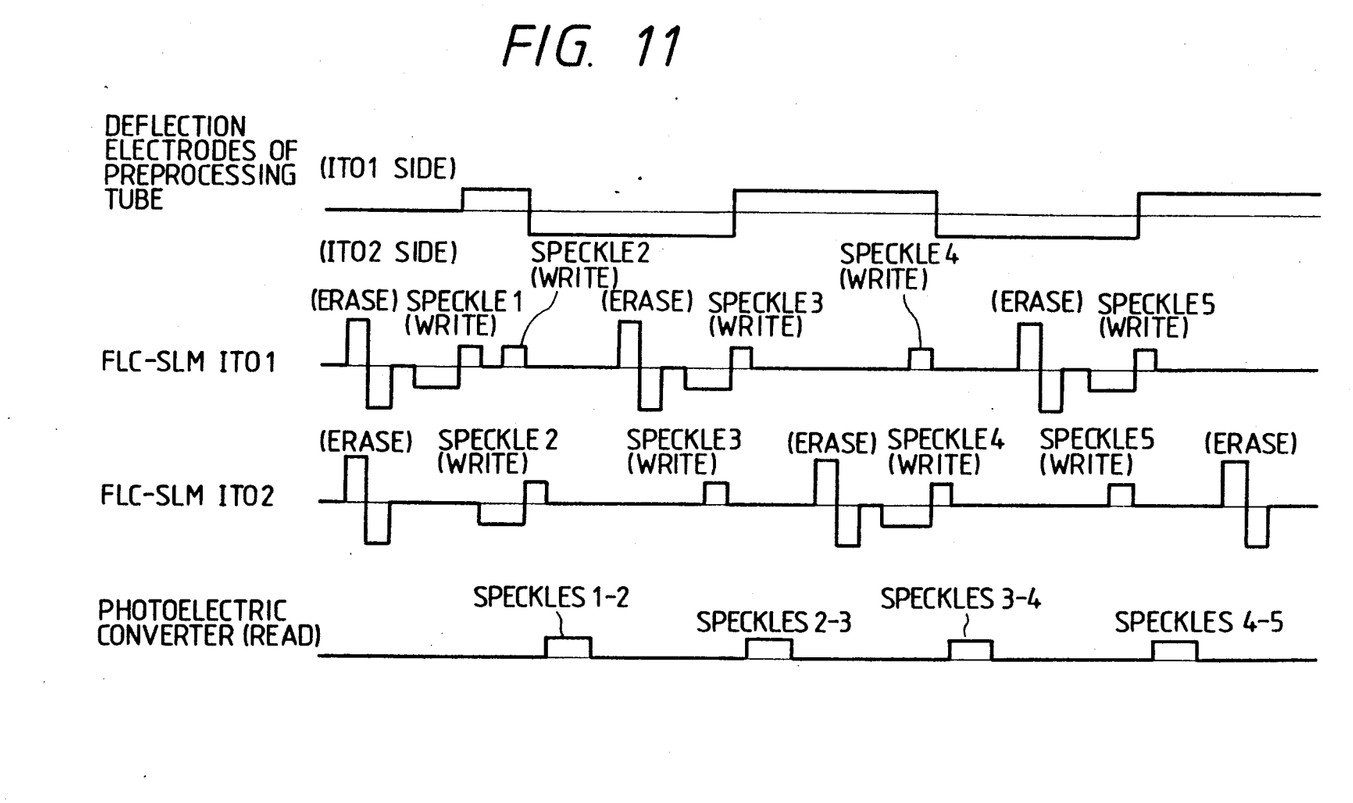
FIG. 11 is a timing chart showing the operation of the apparatus of FIG. 10.

Referring to FIG. 11, the operation of the optical deformation measuring apparatus 60 will be described.

First, images stored in the areas corresponding to the divided transparent electrodes 48A, 48B are erased by the erasing LED 16D.

Next, an electron beam carrying an electron image representing the object 12 at time $t=t0$ is deflected by the deflection electrodes 44C of the pre-processing tube 44 toward the divided transparent electrode 48A to write a speckle pattern 1 into the first area of the optical writing section which corresponds to the divided transparent electrode 48A (represented as "ITO1" in FIG. 11).

Then, a speckle pattern 2 at time $t=t0+\Delta t$ is written into both of the first area and the second area of the optical writing section which corresponds to the divided transparent electrode 48B (ITO2).

Since both the speckle patterns 1 and 2 are stored in the first area by double writing, Young's fringe due to the speckle patterns 1 and 2 is produced on the photoelectric converter 26A by reading out the patterns 1 and 2 and Fourier-transforming them by the Fourier transform lens 54A.

Next, only the information stored in the first area is erased by illumination by the erasing LED 16D and scanning by the deflection electrodes 44C.

Then a speckle pattern 3 at time $t=t0+2\Delta t$ is written into both the first and second areas with scanning by the deflection electrodes 44C.

As a result, a double written pattern of the speckle patterns 2 and 3 are written into the second area. Therefore, Young's fringe due to the speckle patterns 2 and 3 are produced on the photoelectric converter 26A by reading out the image stored in the second area.

As understood from the above description, a deformation (movement) of the object 12 can be measured successively by writing by double writing two speckle patterns into one of the two areas which has just been erased at an interval $\Delta t$ and repeating this procedure in an alternate manner. This makes it possible to conduct a measurement of a deformation (movement) between sets of deformations, which cannot be performed by the first to third embodiments.

Although in the fourth embodiment of FIG. 10, an electron beam carrying a speckle pattern is deflected toward the ITO1 and ITO2 by means of the deflection electrodes 44C of the pre-processing tube 44, the invention is not limited to this structure. For example, the functions similar to those of the pre-processing tube 44 can be realized by the combination of an I.I. and an acousto-optical element.

Figure 12:
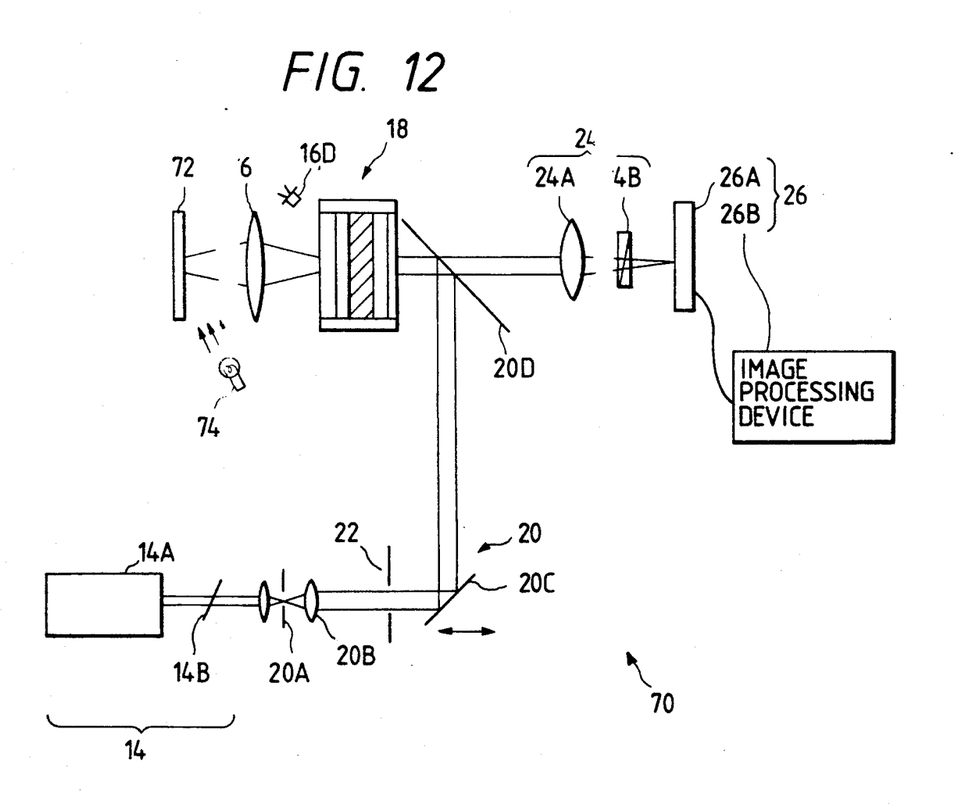
FIG. 12 is an optical system diagram showing an optical deformation measuring apparatus according to a fifth embodiment of the invention.

In the first to fourth embodiments described above, the object 12 is illuminated by laser light and reflected light from the object 12, which carries a speckle pattern, is incident on the input surface of the I.I. 16B or pre-processing tube 44. However, the present invention is not limited to this write-side arrangement. FIG. 12 shows an optical deformation measuring apparatus 70 according to a fifth embodiment of the invention, in which a particle image 72 is illuminated by a white light source 74 and reflected light from the particle image 72 is imaged by an imaging lens 76 onto the input surface of a FLC-SLM 18.

For example, the particle image 72 is an image obtained from tracer particles floating in a fluid. Since the remaining parts of the fifth embodiment is the same as the first embodiment, detailed descriptions for those are omitted.

What is claimed is:

1. An apparatus for measuring a deformation of an object, comprising:
   a light source for illuminating the object;
   input means for forming an input optical image based on reflected or transmitted light from the object;
   a spatial light modulator for storing by double writing the input optical images of the object before and after the deformation thereof in the form of a double-written image;
   a read optical system for introducing read light for reading out the double-written image from the spatial light modulator;
   a Fourier transform optical system for Fourier-transforming an output optical image read out from the spatial light modulator; and
   observing means for measuring the Fourier-transformed image to determine the deformation of the object.

2. The apparatus according to claim 1, wherein the read optical system comprises a variable aperture for changing a diameter of the read light.

3. The apparatus according to claim 1, wherein the read optical system comprises a zooming device for changing a read-out area.

4. The apparatus according to claim 1, wherein the spatial light modulator has a writing section which is separated into a plurality of writing areas;
   the input means can distribute the input optical image to the plurality of writing areas;
   the read optical system introduces the read light to each of the plurality of areas of an output surface of the spatial light modulator; and
   the Fourier transform optical system includes the plurality of Fourier transform optical sub-systems.

5. An apparatus for measuring a deformation of an object, comprising:
   a light source for illuminating the object;
   input means for forming an input optical image based on reflected or transmitted light from the object;

a first spatial light modulator for storing by double writing the input optical images of the object before and after the deformation thereof in the form of a double-written image;

a first read optical system for introducing first read light for reading out the double-written image from the first spatial light modulator;

a first Fourier transform optical system for Fourier-transforming a first output optical image read out from the first spatial light modulator;

a second spatial light modulator for storing the first Fourier-transformed image;

a second read optical system for introducing second read light for reading out the stored first Fourier-transformed image from the second spatial light modulator;

a second Fourier transform optical system for Fourier-transforming a second output optical image read out from the second spatial light modulator; and observing means for measuring the second Fourier-transformed image to determine the deformation of the object.

6. An apparatus for measuring a deformation of an object, comprising:

a light source for illuminating the object;

first input means for forming a first input optical image based on reflected or transmitted light from the object before the deformation thereof;

a first spatial light modulator for storing the first input image;

second input means for forming a second input optical image based on reflected or transmitted light from the object after the deformation thereof;

a second spatial light modulator for storing the second input image;

a read optical system for introducing read coherent light for reading out the first input image from the first spatial light modulator;

optical means for introducing the read coherent light reflected or transmitted from the first spatial light modulator to an output surface of the second spatial light modulator to produce an output optical image which has been subjected to an exclusive-OR operation between the first and second input images;

a Fourier transform optical system for Fourier-transforming the output optical image; and observing means for measuring the Fourier-transformed image to determine the deformation of the object.

7. The apparatus according to claim 6, wherein the first and second spatial light modulators include a single spatial light modulator having a writing section which is separated into at least two writing areas, and the first and second input means include a single input means for forming the first and second optical input images onto the first and second spatial light modulators, respectively.

8. The apparatus according to any one of claims 1, 5 or 6 wherein the light source is a laser light source, and the input optical image is a speckle pattern.

9. The apparatus according to any one of claims 1, 5 or 6 wherein the spatial light modulator is a ferroelectric liquid crystal spatial light modulator.

10. The apparatus according to any one of claims 1, 5 or 6 wherein the input means includes means for amplifying the input optical image.

* * * * *